US006402811B1

(12) United States Patent
Shanks et al.

(10) Patent No.: US 6,402,811 B1
(45) Date of Patent: Jun. 11, 2002

(54) NON-DUSTING SORBENT MATERIAL FILTER

(76) Inventors: Anthony E. Shanks, 5501 Starview La.; Patrick J. Monnens, 3340 Spruce Trail, both of Prior Lake, MN (US) 55372; Richard R. Bahn, 5375 Sunset La., Loretto, MN (US) 55357; Edward L. Schwarz, 2825 Brookwood Ter., Minneapolis, MN (US) 55410

( * ) Notice: Subject to any disclaimer, the term of this patent is extended or adjusted under 35 U.S.C. 154(b) by 0 days.

(21) Appl. No.: 09/475,890

(22) Filed: Dec. 30, 1999

(51) Int. Cl.⁷ .............................................. B01D 53/04
(52) U.S. Cl. ................. 95/90; 96/121; 96/147; 96/151; 55/512; 55/515
(58) Field of Search ............... 96/90, 116, 141, 96/108, 121, 129, 131, 135, 138, 142, 147, 148, 151, 154; 55/341.1, 341.5, 361, 381, 512, 515, 516, 517, 518, 519, DIG. 5, DIG. 12, 502; 264/DIG. 48

(56) References Cited

U.S. PATENT DOCUMENTS

| | | | | |
|---|---|---|---|---|
| 2,085,991 A | * | 7/1937 | Minor | 96/118 |
| 2,578,324 A | * | 12/1951 | Southwick, Jr. | 96/153 |
| 2,764,251 A | * | 9/1956 | Jessop | 96/137 |
| 4,052,166 A | * | 10/1977 | Mita et al. | 55/518 |
| 4,224,366 A | * | 9/1980 | McCabe, Jr. | 96/121 |
| 4,523,588 A | | 6/1985 | Dolsky | |
| 4,534,775 A | | 8/1985 | Frazier | |
| 4,756,726 A | * | 7/1988 | Peace | 55/515 |
| 4,830,643 A | * | 5/1989 | Sassa et al. | 96/108 |
| 4,859,220 A | * | 8/1989 | Leber et al. | 96/131 |
| 5,022,902 A | * | 6/1991 | Juhl et al. | 96/108 |
| 5,069,694 A | * | 12/1991 | Cullen et al. | 96/154 |
| 5,087,273 A | * | 2/1992 | Ward | 96/147 |
| 5,129,929 A | * | 7/1992 | Linnersten | 96/134 |
| 5,302,354 A | | 4/1994 | Watvedt et al. | |
| 5,348,563 A | | 9/1994 | Davis | |
| 5,354,365 A | * | 10/1994 | Youn | 96/135 |
| 5,423,903 A | * | 6/1995 | Schmitz et al. | 96/147 |
| 5,468,447 A | * | 11/1995 | Bermas | 422/5 |
| 5,538,545 A | * | 7/1996 | Dauber et al. | 96/154 |
| 5,562,286 A | | 10/1996 | Brinket | |
| 5,693,124 A | * | 12/1997 | Dobson et al. | 96/147 |
| 5,942,323 A | | 8/1999 | England | |
| 5,961,702 A | | 10/1999 | Doneit | |
| 6,139,609 A | * | 10/2000 | Eimer et al. | 96/151 |

OTHER PUBLICATIONS

United Air Specialties, Inc., Advertisement Brochure entitled, "Crystal–Aire Modular Air Cleaning Systems", ©1992, pp. 1–4.

* cited by examiner

Primary Examiner—Duane Smith
Assistant Examiner—Jason M. Greene

(57) ABSTRACT

A sorbent filter for use with an air-purifying apparatus. The filter includes a flexible bag and a sorbent material in granular form. The flexible bag defines at least one storage region and is formed of a porous material. The sorbent material is disposed within the storage region. With this configuration, the porosity of the flexible bag is configured to allow passage of air such that the air, including air-borne gaseous molecules or odors, can interact with and be adsorbed by the sorbent material. Conversely, however, the porosity of the flexible bag limits passage of sorbent material granules and dust. As such, the filter generates little if any dust during handling. In one preferred embodiment, the flexible bag is selectively attachable to a separate frame that in turn is designed for mounting within the air-purifying apparatus. With this configuration, the frame can be re-used such that filter replacement requires only a new sorbent filter.

17 Claims, 6 Drawing Sheets

NON-DUSTING SORBENT MATERIAL FILTER

BACKGROUND OF THE INVENTION

The present invention relates to a filter for use with an air-purifying apparatus. More particularly, it relates to an inexpensive, granular sorbent material filter having a non-dusting attribute.

In recent years, there has been a growing interest to improve environmental air conditions in homes and in commercial settings such as offices, restaurants, taverns, bowling alleys, hospitals, laboratories, lavatories, and the like. As more information has been made available to the public concerning the hazards of indoor air pollution, there has been an increased demand for filtering devices that can be used to effectively improve air quality.

With respect to commercial settings, a popular filtering technique entails placement of a self-contained, stand-alone air-cleaning or filtration unit over the room of interest. The air filtration unit can assume a variety of forms, but typically includes a housing maintaining a fan or blower and one or more applicable filter materials. The housing defines an inlet, at which the filter(s) is disposed, as well as an outlet or exhaust port. Most commercial settings include a false ceiling, such that the housing is easily "hidden" above the ceiling, with only the intake or an associated grille being visible to persons within the room. During use, the fan or blower is operated to draw room air through the filter material(s) via the inlet. The filter material removes undesirable air-borne particles and/or odors such as dust, smoke, pollen, molds, etc. from the airflow. Following interaction with the filter material, the now "cleansed" air is forced, via the fan or blower, into the room through the outlet port. A continuous intake and supply of air preferably generates a desirable air re-circulation pattern within the room.

Certain types of filter media, or combinations of different filter media, have been identified as being highly proficient in removing unwanted airborne contaminants. To this end, airborne contaminants are generally categorized as particulate (e.g., pollen, molds, bacteria, smoke, etc.) or gaseous (e.g., odor, carbon monoxide, formaldehyde, volatile organic compounds (VOCs), etc.). A particulate filter is employed to remove airborne fibers and particles, and is typically "rated" according to filtering efficiency and resistance to airflow. For example, a well-known particulate filter is a high efficiency particulate arrestance (HEPA) filter. HEPA filters are generally comprised of intertwined, small (less than 1 micron) glass fibers and have a minimum efficiency of 99.97% relative to 0.3 micron dioctyl phthalate (DOP) particles. Alternatively, the particulate filter may assume other forms (with lower efficiencies), such as cellulose, wool felt or glass fibers filters with efficiencies ranging from 30%–95% ASHRAE rated dust spot efficiency. For enhanced filtration of gas molecules and odors (e.g., tobacco smoke odors, cooking odors, volatile organic compounds (VOCs), etc.), a sorbent material-based filter (or "sorbent filter") is normally employed. The sorbent filter typically includes a relatively large volume of an appropriate sorbent material, in granular form, or a combination of granular sorbent materials. The sorbent material adsorbs odor-causing gases and other gaseous contaminants, thereby removing the contaminant from the air. Sorbent materials identified as being most effective in removing odors include charcoal or carbon, potassium permanganate and zeolite. In fact, an extremely popular sorbent filter material is available under the trade name CPZ™, generally composed of 60% charcoal or carbon, 20% potassium permanganate and 20% zeolite.

With the above filtering medias in mind, it has been found advantageous for a commercial air filtration unit to include a pre-filter, a primary particulate filter (e.g., HEPA filter, 95% ASHRAE filter, etc.) and a sorbent filter. The pre-filter is normally an inexpensive, low efficiency (e.g., on the order of 15% dust spot efficiency) impingement filter, such as open cell foam, employed to capture relatively large particles, thereby extending the useful life of the primary particulate filer. Regardless, the primary particulate filter is normally disposed upstream of the sorbent filter to optimize overall filtering performance.

Installation and replacement of the above-described primary particulate filter is highly convenient due to the filter's construction. For example, a BEPA filter is generally formed as a continuous sheet, and can be installed with relative ease. In contrast, sorbent filters are normally quite large and unwieldy. Further, during installation and/or replacement, the individual sorbent material granules constantly contact and abrade against one another, generating a fine dust. This dust is highly undesirable, having many adverse effects including possible respiratory problems, unsightly stains on nearby persons and objects, reduction in unit airflow capacity immediately following installation, etc.

Efforts have been made to overcome the dusting problems associated with sorbent material filters. For example, the sorbent material can be formed as a foam. While eliminating dust, the foam sorbent filter has a highly diminished particle/odor retention capacity. Alternatively, the granular sorbent material may be loosely placed within a sealed, rigid encasement. A series of panels or trays are similarly disposed within the case to better maintain the sorbent material as well as to achieve a desired air flow pattern. Even with this encased configuration, some dusting still occurs. Further, the case is quite bulky, rendering installation difficult. Also, the sorbent material is typically unevenly dispersed within the case, leading to diminished filter performance. Additionally, at the end of sorbent material's useful life, the entire filter device must be replaced. As a point of reference, encased sorbent filters are relatively expensive, making replacement a costly proposition.

Air-purifying devices, and in particular commercial air-purifying units incorporating a sorbent material filter, are extremely popular and beneficial. However, certain potential drawbacks associated with sorbent filters, including undesirable dust generation and high replacement costs, have been identified, yet remain unresolved. Therefore, a need exists for a cost-effective sorbent material filter that generates little or no dust during installation and use.

SUMMARY OF THE INVENTION

One aspect of the present invention relates to a filter for use with an air-purifying apparatus. The filter comprises a flexible bag and a sorbent material in granular form. The flexible bag defines at least one storage region. The sorbent material is disposed within the at least one storage region. With this configuration, the bag is formed of a porous material configured to allow passage of air such that the air, including air-borne particles and/or odors can interact with, and be adsorbed by, the sorbent material. However, the porous material used for the bag limits passage of sorbent material. As such, the filter generates little if any dust during handling. In one preferred embodiment, the flexible bag forms a plurality of storage regions and is selectively attached to a separate frame that in turn is designed for mounting within the air-purifying apparatus. With this design, the frame can be re-used such that sorbent filter replacement requires only a new flexible bag containing the granular, sorbent material.

Another aspect of the present invention provides a method of assembling a sorbent filter for use with an air-purifying apparatus. The method includes providing a flexible bag and then forming at least one storage region in the bag. A sorbent material in granular form is disposed into the storage region. The storage region is then closed. Upon final assembly, the bag substantially prevents release of sorbent material dust from the storage regions. In one preferred embodiment, a plurality of storage regions are formed in the bag, with the sorbent material being evenly dispersed within each of the storage regions such that the resulting sorbent filter is relatively compact.

Yet another aspect of the present invention provides a method of replacing an air filter assembly used with an air-purifying apparatus. The air filter assembly includes a sorbent filter releasably secured to a frame configured for mounting within the air-purifying apparatus. With this in mind, the method includes removing the sorbent filter assembly from the air-purifying apparatus. The sorbent filter is then removed from the frame. A new sorbent filter comprising a flexible bag forming at least one storage region and a sorbent material in granular form disposed within the storage region is provided. The new sorbent filter is assembled to the frame to provide a new sorbent filter assembly. Finally, the new sorbent filter assembly is secured within the air-purifying apparatus. With this method, the filter frame is re-used, such that replacement of the air filter assembly requires only a new sorbent filter.

DESCRIPTION OF THE PREFERRED EMBODIMENTS

Figure 1:
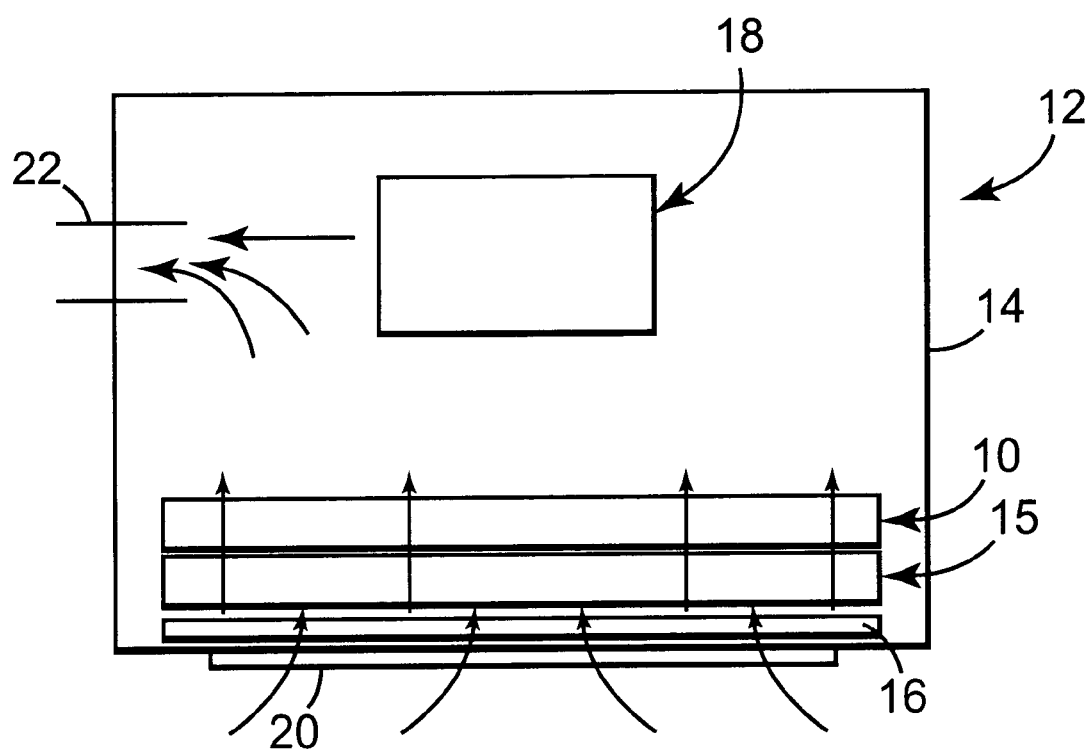
FIG. 1 is a schematic view of air-purifying apparatus incorporating a sorbent filter in accordance with the present invention.

One preferred embodiment of a sorbent filter 10 in accordance with the present invention is shown in FIG. 1. As a point of reference sorbent, filter 10 is shown in conjunction with an air-purifying apparatus 12. Air-purifying apparatus 12 is of a type known in the art and preferably includes a housing 14, a primary particulate filter 15, a pre-filter 16 and a blower unit or fan 18. Sorbent material filter 10, primary particulate filter 15, pre-filter 16 and blower unit 18 are disposed within housing 14.

Housing 14 is made of a rigid material, such as galvanized steel or aluminum, and forms an inlet 20 and an outlet or exhaust 22. Primary particulate filter 15 is sized for placement within housing 14 and is of a type known in the art. For example, primary particulate filter 15 is preferably a HEPA filter, but alternatively can be a 95% ASHRAE rated filter or an even lower efficiency particulate filter (e.g., 40%–95% ASHRAE rated filter). Pre-filter 16 is similarly sized in accordance with housing 14 and is a lower efficiency impingement filter (on the order of 15% dust spot efficiency), such as an open cell foam, cellulose, etc.

With this configuration, blower unit 18 draws air into housing 14 at inlet 20, as shown by arrows in FIG. 1. Air flow passes through pre-filter 16, which removes relatively large air-borne particles, and then through particulate-type filter 15 for removal of smaller airborne particles and fibers. Subsequently, airflow passes through sorbent filter 10. As described in greater detail below, sorbent filter 10 adsorbs gaseous contaminants and odors from the airflow. Fan 18 then directs the now clean air outwardly from housing 14 at exhaust 22. Air exiting exhaust 22 may be returned to the room of interest (not shown), or may be exhausted to an adjacent room or area.

It will be understood that air-purifying apparatus 12 shown in FIG. 1 is but one example of an acceptable design. For example, air-purifying apparatus 12 may include a plurality of fans 18, a plurality of filters 10, 15 and/or 16, a plurality of outlets 22, etc. Further, blower unit 18 can be formed as a separate module, spaced from housing 14. With this configuration, blower unit 18 is fluidly connected to housing 14 to create a desired air flow pattern.

Figure 2:
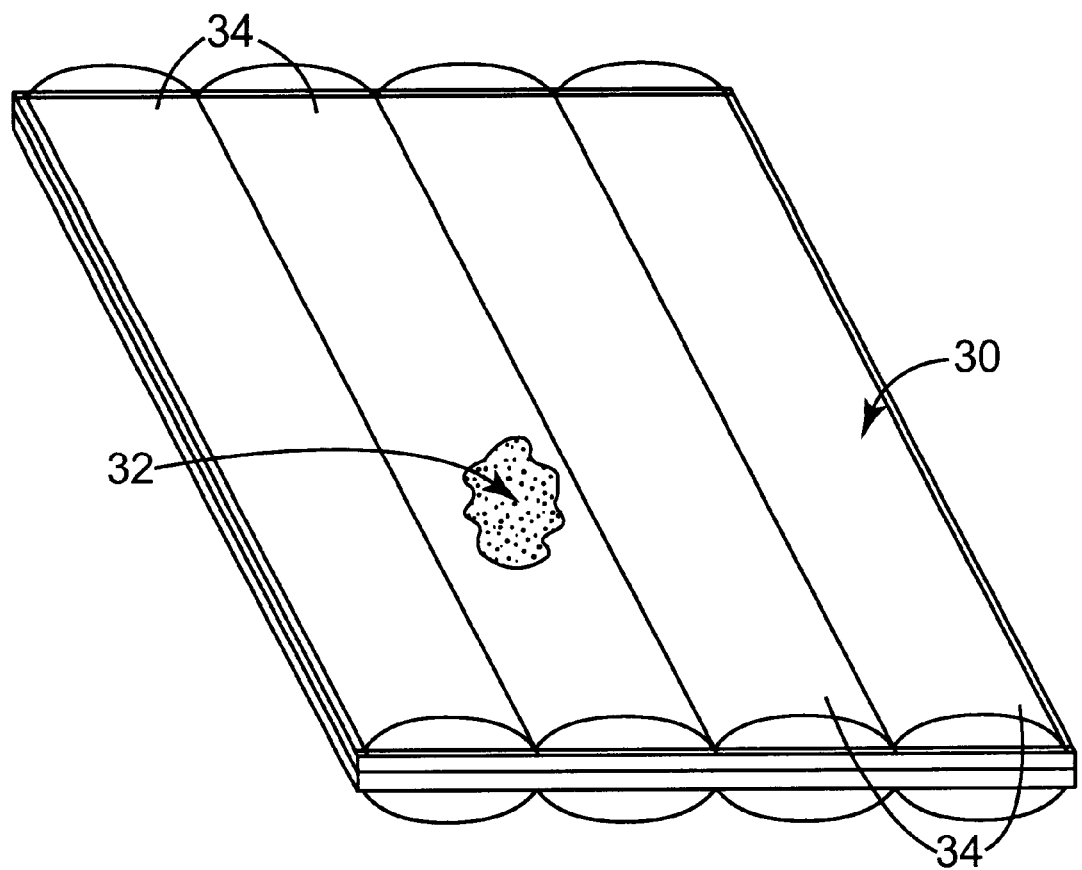
FIG. 2 is a perspective view of a sorbent filter in accordance with the present invention, including a cutaway view showing a portion of a granular sorbent material.

One preferred embodiment of sorbent filter 10 is shown in FIG. 2. Sorbent filter 10 is comprised of a flexible bag 30 and a granular sorbent material 32. As described in greater detail below, flexible bag 30 forms at least one, preferably a plurality, of storage regions 34 within which sorbent material 32 is disposed. As illustrated in FIG. 2, the preferred plurality of storage regions 34 imparts a pillow-like appearance to sorbent filter 10. However, flexible bag 30 may instead be configured to provide a single storage region 34.

Figure 3:
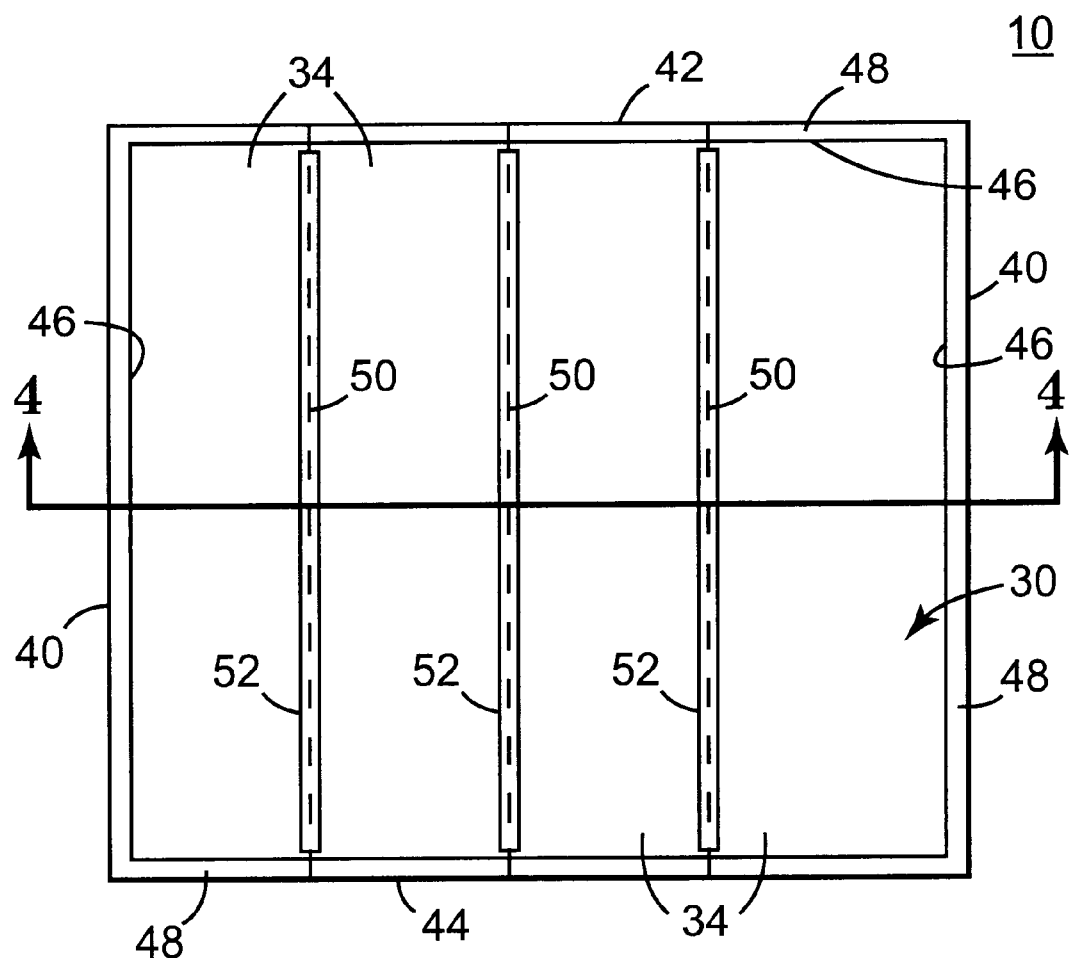
FIG. 3 is a top view of the filter of FIG. 2.
Figure 4:
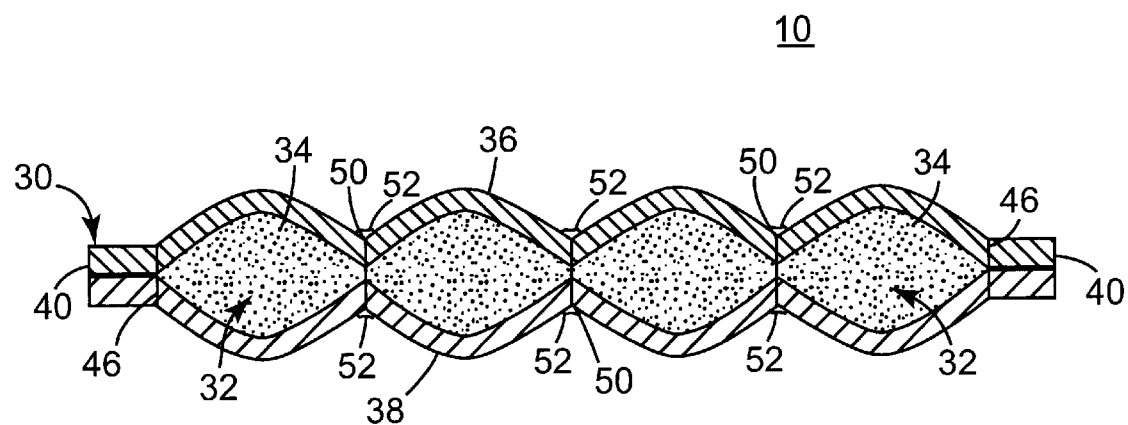
FIG. 4 is a cross-sectional view of the filter of FIG. 2.

Flexible bag 30 is formed to enclose and contain sorbent material 32. As best shown in FIGS. 3 and 4, flexible bag 30 is, upon final assembly, preferably substantially flat. With this configuration, flexible bag 30 defines a top portion 36, a lower portion 38, opposing sides 40, a first end 42 and a second end 44. As best shown in FIG. 4, top portion 36 and lower portion 38 are substantially parallel upon final assembly. In one preferred embodiment, top portion 36 and bottom portion 38 are provided as separate layers, secured to one another, in part, by a perimeter seal 46 extending along opposing sides 40, first end 42 and second end 44. Perimeter seal 46 is preferably stitching or a heat seal and is positioned slightly spaced from perimeter edges, respectively, of top and bottom portions 36, 38, preferably by approximately 1.25 inches. This preferred placement of perimeter seal 46 generates an overhang or lip 48 useful for subsequent attachment of sorbent filter 10 to a frame (not shown) as described in greater detail below. Alternatively, perimeter seal 46 can be formed at the perimeter edges, thereby eliminating lip 48. While flexible bag 30 is preferably formed by two separate layers, other configurations are equally acceptable. For example, flexible bag 30 can be a single layer of material folded onto itself to generate top portion 36 and bottom portion 38. Even further, flexible bag 30 can be formed as a tube that is flattened to define top portion 36 and bottom portion 38. In this flattened state, opposing sides 40 are defined, being continuous with top and bottom portions 36, 38. Subsequently, first end 42 and second end 44 are closed via perimeter seal 46.

Regardless of the exact formation of flexible bag 30, top portion 36 and bottom portion 38 are further secured to one another by seams 50 to generate the plurality of storage regions 34. As best shown in FIG. 3, seams 50 preferably extend in a longitudinal fashion from first end 42 to second end 44, intersecting perimeter seal 46 as shown. In one preferred embodiment, each of seams 50 are preferably substantially parallel with opposing sides 40, and are spaced from perimeter seal 46 associated with opposing sides 40. Each seam 50 defines a side section or longitudinal edge of at least one of storage regions 34. In one preferred embodiment, seams 50 are approximately equidistantly spaced, such that storage regions 34 define substantially equivalent available volumes. Alternatively, however, seams 50 can assume other configurations and/or locations such that storage regions 34 have unequal volumes.

Seams 50 can be formed in a wide variety of fashions. For example, in one preferred embodiment, each of seams 50 comprises a single weave or length of stitching. In this regard, a high tenacity material, such as polyester thread V92, is preferably employed for the stitching. Alternatively, multiple rows of stitching can be used to define each of seams 50. In addition, or alternatively, seams 50 may be heat seals, or a hot melt adhesive. Other attachment techniques can alternatively be employed as known in the art, for example an appropriate adhesive, mechanical fastener, etc. Regardless, in one preferred embodiment, three of seams 50 are provided, thereby forming four storage regions 34 (with the perimeter seal 46 associated with opposing sides 40 defining an edge of outer most storage regions 34, respectively). Alternatively, any other number of seams 50, and therefore storage regions 34, can be provided. In fact, sorbent filter 10 need only include a single seam 50, thereby defining two storage regions 34. As made clear below, the number, therefore size, of storage regions 34 is configured to be commensurate with a desired volume of granular sorbent material 32 disposed within flexible bag 30.

In one embodiment, a strip 52 of air impermeable material or coating covers each seam 50 and adjacent bag 30 surface. Strip 52 being air impermeable prevents leakage of air and/or sorbent material through and adjacent to seams 50. With this configuration, strip 52 minimizes the possibility during use of air leaking through regions near seams 50 where there is a reduced thickness of sorbent material 32. As previously described, during use, air passes through sorbent filter 10. Sorbent filter 10 reduces the airflow rate, generating a desired pressure drop. It is possible that the converging portions 36 and 38 in the region(s) of seam(s) 50 may allow for increased airflow and reduced filter efficiency. Strip 52 prevents excessive airflow at seams 50. Material used for strip 52 can assume a wide variety of forms, such as a rubberized coating, a tape, etc. For example, the rubberized material can be formulated to be liquid upon application (such as with a V-shaped roller), subsequently curing or "hardening" to encompass a surface of a respective seam 50. Notably, however, sorbent filter 10 functions very well without strip 52, such that strip 52 is not a required element.

In addition to being flexible, material employed for flexible bag 30 is preferably porous. A porosity of the material selected for flexible bag 30 is sized to allow passage of air and gaseous contaminants and/or odors into contact with sorbent material 32. Conversely, however, the porosity is sufficiently small to substantially limit, preferably prevent, release of individual grains of granular sorbent material 32 and sorbent material dust particles. To this end, material for flexible bag 30 preferably has a pore size of less than 0.1 micron. For example, in one preferred embodiment, flexible bag 30 is formed of a woven 6 ounce/square yard polyester material, having a thickness of 0.5 inch. With this preferred material, each of top portion 36 and bottom portion 38 has a thickness of approximately 0.5 inch. Alternatively, however, other known materials, such as a porous foam, other woven polymer fibers, non-woven polymer-based material, etc., can be employed.

Granular sorbent material 32 is disposed within each of plurality of storage regions 34. Granular sorbent material 32 can assume a wide variety of forms known in the art, selected to achieve desired adsorption of undesirable air pollutants, such as tobacco smoke odors, cooking odors, VOCs, etc. Examples of acceptable sorbent material include charcoal or carbon, potassium permanganate, and zeolite, to name but a few. Even further, granular sorbent material 32 may include a combination of two or more acceptable materials. For example, in one preferred embodiment, granular sorbent material 32 includes a combination of charcoal, potassium permanganate, and zeolite. One preferred combination is available under the trade name CPZ™, composed of 60% charcoal or carbon, 20% potassium permanganate, and 20% zeolite. However, any other sorbent material or materials 32 can be employed.

Figure 5:
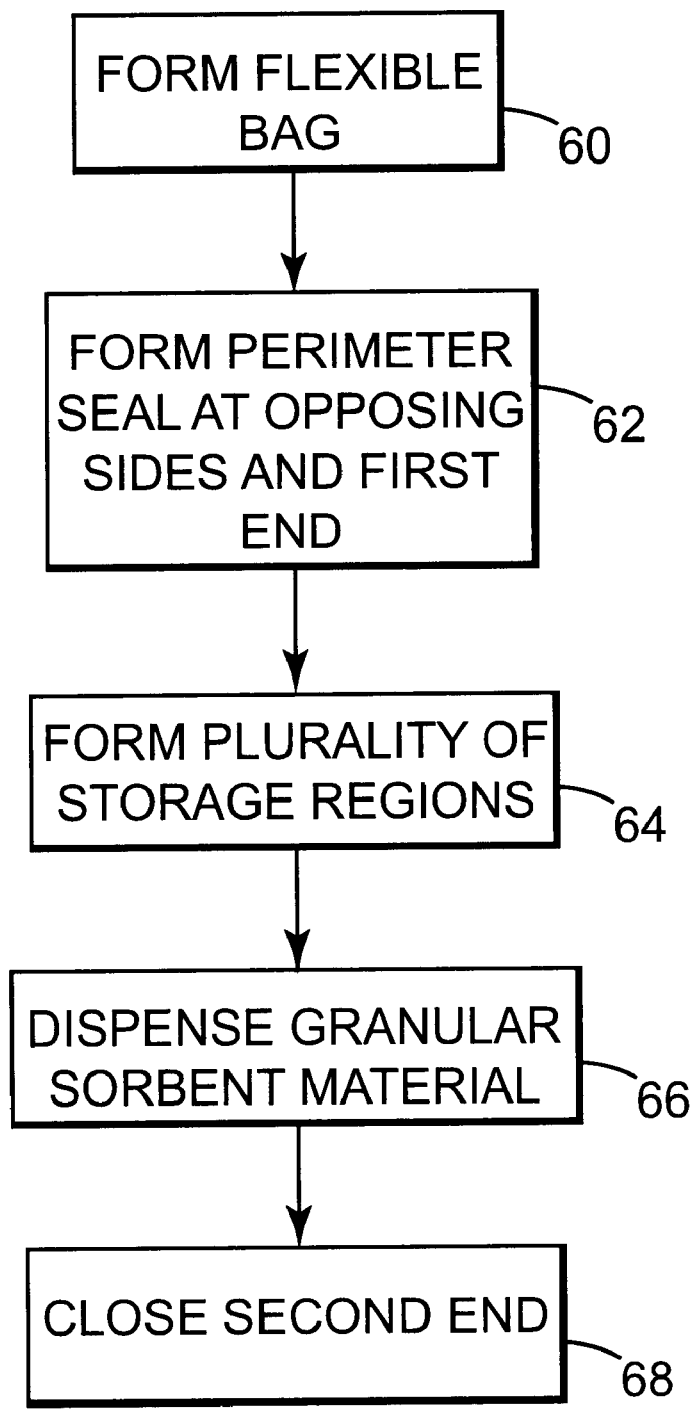
FIG. 5 is a flow diagram illustrating a method for manufacturing a sorbent filter in accordance with the present invention.

One preferred method of assembling sorbent filter 10 is described with reference to FIG. 2 and the flow chart of FIG. 5. Flexible bag 30 is first formed at step 60. As previously described, in one preferred embodiment, flexible bag 30 is generally comprised of two separate layers forming top portion 36 and bottom portion 38. As a point of reference, an overall size of flexible bag 30, and therefore sorbent filter 10, is dependant upon the particular air-purifying apparatus 12 (FIG. 1) for which sorbent filter 10 is to be used. With this in mind, in one preferred embodiment, each of the opposing layers 36, 38 are sized and orientated to provide opposing sides 40 having a length in the range of 18–24 inches, most preferably approximately 21.5 inches; and first and second ends 42, 44 having a length in the range of 20–30 inches, most preferably approximately 25 inches. Alternatively, other appropriate dimensions may be employed. Regardless, once properly orientated, top and bottom portions 36, 38 are partially secured to one another via perimeter seal 46 at step 62. Perimeter seal 46 is preferably formed adjacent, but slightly spaced from, each of opposing sides 40 and first end 42. In one preferred embodiment, perimeter seal 46 is spaced from respective opposing side 40 and first end 42 by a distance in the range of 0.5–2 inches, most preferably approximately 1.25 inches, to generate lip 48, although other spacings are equally acceptable. Notably, perimeter seal 46 is not formed at second end 44 at step 62. Thus, second end 44 is open. Perimeter seal 46 can be formed by a variety of fashions known in the art, such as stitching, heat seal, adhesive, etc.

Top and bottom portions 36, 38 are then secured to one another along seams 50 to generate a plurality of storage regions 34 at step 64. As previously described, seams 50 preferably extend from first end 42 to second end 44, generally parallel with opposing sides 40. In one preferred embodiment, each of seams 50 extends through perimeter seal 46 associated with first end 42. Alternatively, however, each of seams 50 need only extend proximate perimeter seal 46 at first end 42. Further, while each of seams 50 are shown as being generally parallel with opposing sides 40, seams 50 can instead extend in an angular fashion from second end 44. Regardless, plurality of storage regions 34 defined, at least in part, by seams 50 are open at second end 44. In one preferred embodiment, three of seams 50, and thus four storage regions 34, are provided, each being equidistantly spaced. With reference to in the preferred embodiment, seams 50 are transversely spaced by approximately 5.625 inches. Alternatively, other spacings, for example non-equidistant spacings, can be utilized. Even further, where flexible bag 30 forms a single storage region 34, seams 50 are not required.

Granular sorbent material 32 is then dispensed into plurality of storage regions 34 via second end 44 at step 66. In a preferred embodiment, granular sorbent material 32 is tightly packed within each of storage regions 34 such that granular sorbent material 32 is substantially evenly dispersed across each of storage regions 34. As best shown in FIG. 4, the material employed for flexible bag 30 is slightly resilient or flexible and preferably stretches slightly to accommodate the desired volume of granular sorbent material 32. However, a material for flexible bag 30 is preferably not overly resilient such that flexible bag 30 tightly maintains granular sorbent material 32. For example, with reference to preferred dimensions of flexible bag 30 described above, each storage region 34 compactly maintains 1–3 pounds, most preferably approximately 2.5 pounds, of granular sorbent material 32.

Second end 44 is then closed with perimeter seal 46 at step 68. Once again, perimeter seal 46 is preferably slightly spaced from second end 44, preferably by approximately 1.25 inches, to generate lip 48. Where desired, strip 52 (FIG. 3) is placed across each of seams 50.

It should be understood that the above-described method of manufacturing sorbent filter 10 is but one acceptable technique. For example, flexible bag 30 may be pre-formed, and therefore not require substantial portions of perimeter seal 46.

Upon final assembly, sorbent filter 10 provides a relatively large amount of granular sorbent material 32 in a relatively flat, bed-like configuration. For example, in one preferred embodiment, sorbent filter 10 has an overall height (or thickness) in the range of 1–3 inches, most preferably approximately 2.25 inches although other heights are equally acceptable.

Figure 6:
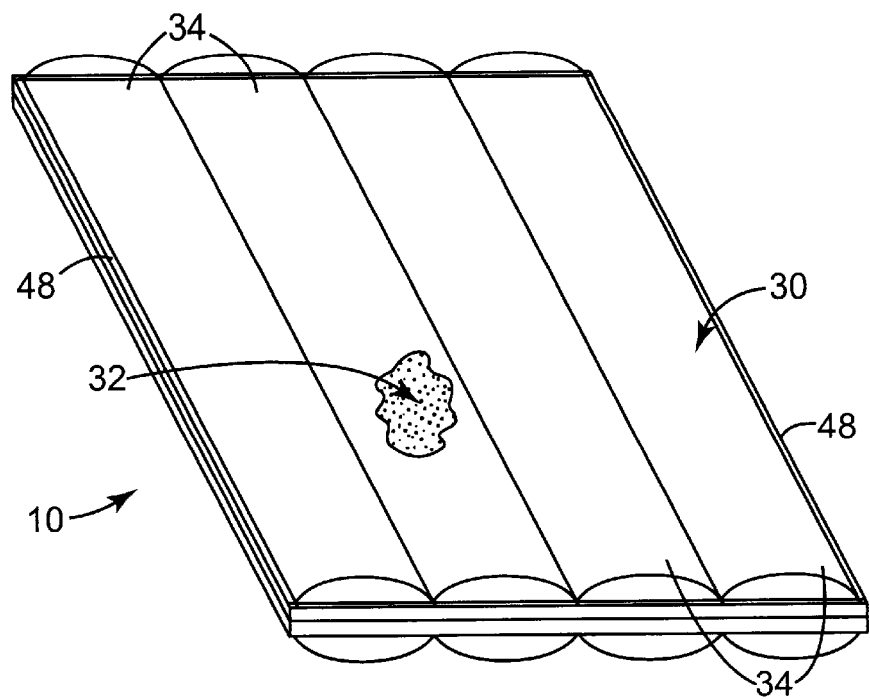
FIG. 6 is an exploded, perspective view of a filter assembly incorporating a sorbent filter in accordance with the present invention.
Figure 6:
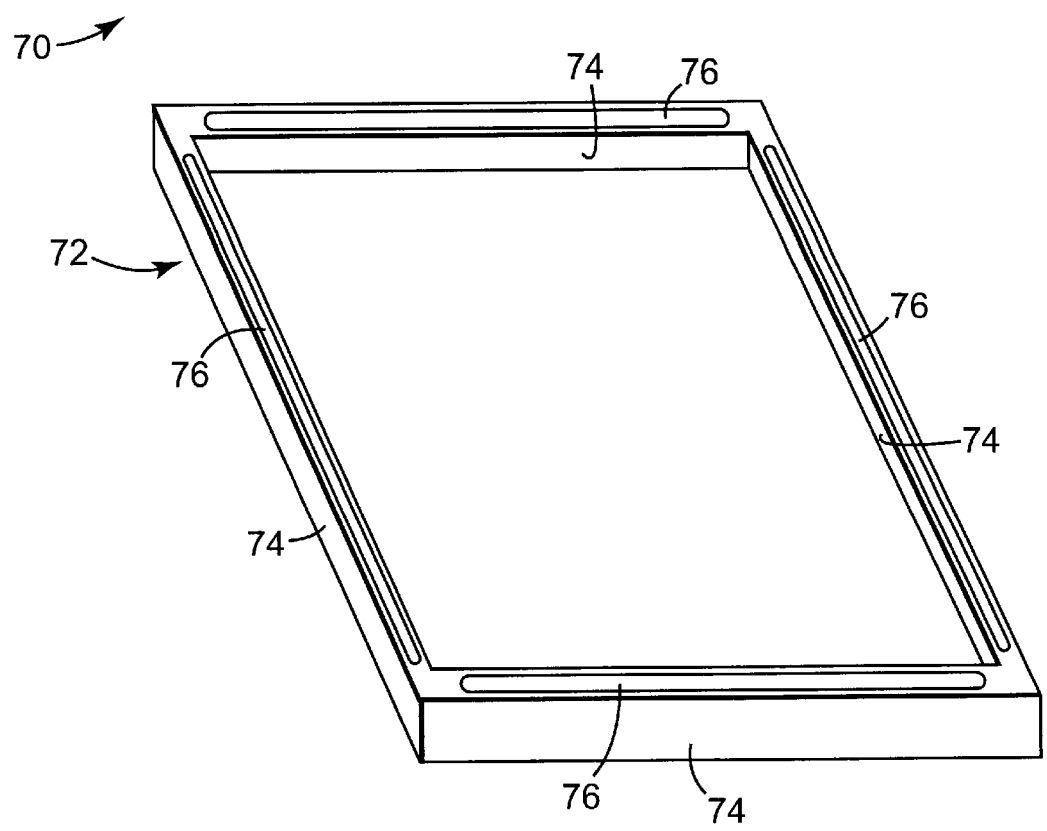

During use, sorbent filter 10 can be directly assembled within an air-purifying apparatus (such as air purifying apparatus 12 shown in FIG. 1). Alternatively, and more preferably, sorbent filter 10 is utilized as part of a filter assembly 70 as shown in FIG. 6. Filter assembly 70 includes sorbent filter 10 and a frame 72. Frame 72 is preferably of a type commonly known in the art and is configured for assembly within air-purifying apparatus 12 (FIG. 1). One example of an acceptable frame 72 includes four side walls 74, each forming a slot 76. With this configuration, sorbent filter 10 is assembled to frame 72 by securing lip 48 within slots 76, respectively. For example, due to the preferred flexible nature of flexible bag 30, lip 48 is somewhat pliable. As a result, lip 48 can easily be forced into slots 76, thereby attaching sorbent filter 10 to frame 62. Notably, however, sorbent filter 10 can be removed from frame 72 by simply retracting lip 48 from slots 76. This preferred selective attachment of sorbent filter 10 to frame 72 can be achieved with a variety of other attachment designs, including releasable mechanical fasteners, etc.

During use, filter assembly 70, or sorbent filter 10 alone, is installed within air-purifying apparatus 12 (FIG. 1). Notably, as part of the handling associated with installation, sorbent filter 10 will generate minimal, if any, sorbent material dust. In this regard, flexible bag is relatively soft such that granular sorbent material 32 disposed within flexible bag 30 will not abrade against flexible bag 30. Further, while individual granules of sorbent material 32 may abrade against one another, any resulting dust is contained within flexible bag 30. That is to say, a porosity of flexible bag 30 is such that individual granules of sorbent material 32, as well sorbent material dust particles, are consistently contained within flexible bag 30. As a result, sorbent filter 10 is effectively non-dusting.

Following installation of filter assembly 70 (or sorbent filter 10 alone), air-purifying apparatus 12 (FIG. 1) is available for cleaning room air. In accordance with the preferred embodiment, sorbent filter 10 exhibits a pressure drop of less than approximately 0.1 inches of water gage (0.1 inWG). Additionally, sorbent filter 10 adsorbs unwanted gaseous molecules and/or odors. Because granular sorbent material 32 is relatively evenly dispersed within plurality of storage regions 34, air flow passing through sorbent filter 10 will interact with a sufficient quantity of granular sorbent material 32 regardless of whether air flow passes centrally through sorbent filter 10 or at outer portions thereof.

Over time, the adsorption capacity of granular sorbent material 32 will diminish, requiring sorbent filter 10 replacement. Thus, at an end of the useful life of granular sorbent material 32, filter assembly 70 is removed from air-purifying apparatus 12. Sorbent filter 10 is then removed from frame 72. A new, similarly constructed sorbent filter 10 is provided and assembled to frame 72 as described above. Filter assembly 70 is then re-installed to air-purifying apparatus 12. Thus, by forming sorbent filter 10 in accordance with the present invention, frame 72 is re-usable. In other words, replacement of sorbent filter 10 does not require a new frame, thereby greatly reducing overall cost.

The sorbent filter of the present invention provides a marked improvement over previous designs. The sorbent filter generates little or no sorbent material dust, and is effectively a non-dusting filter. This important characteristic is achieved on a highly cost-effective basis, as materials and related manufacturing steps are relatively inexpensive. Further, the granular sorbent material is relatively evenly dispersed across the sorbent filter, thereby optimizing filter performance. Finally, the sorbent filter facilitates easy, inexpensive replacement as part of an overall filter assembly in that the filter assembly frame can be re-used.

Although the present invention has been described with reference to preferred embodiments, workers skilled in the art will recognize that changes can be made in form and detail without departing from the spirit and the scope of the present invention. For example, the sorbent filter has been preferably described as assuming a generally rectangular shape. Alternatively, however, other shapes are acceptable. For example, the sorbent filter can be circular, square, triangular, etc. Even further, the sorbent filter can be irregularly shaped. Finally, the flexible bag need only form a single storage region for maintaining the sorbent material, as opposed to the plurality of storage regions depicted in the preferred embodiment.

What is claimed is:

1. A method of replacing an air filter assembly used with an air-purifying apparatus, said filter assembly including a sorbent filter releasably secured to a frame forming a receiving slot and configured for attachment within said air-purifying apparatus, the method comprising:

removing said sorbent filter assembly from said air-purifying apparatus;

removing said sorbent filter from said frame;

providing a new sorbent filter comprising a flexible bag forming at least one storage region and a sorbent material in granular form disposed with said storage region, wherein said flexible bag defines a lip;

assembling said new sorbent filter to said frame by forcing said lip into said receiving slot to provide a new sorbent filter assembly; and attaching said new sorbent filter assembly within said air-purifying apparatus.

2. The method of claim 1, wherein said flexible bag is substantially flat.

3. The method of claim 2, wherein said flexible bag defines a top portion, a bottom portion, a perimeter, and a plurality of storage regions, and further wherein a section of at least one of said storage regions is formed by a seam connecting said top and bottom portions.

4. The method of claim 3, wherein said seam comprises a heat seal.

5. The method of claim 3, wherein said seam comprises stitching.

6. The method of claim 1, wherein said flexible bag further includes an air impermeable strip covering said seam.

7. The method of claim 3, wherein said seam is formed substantially parallel with a side defined by said perimeter.

8. The method of claim 3, wherein said plurality of storage regions are defined by a plurality of said seams, said seams being spaced from one another.

9. The method of claim 1, wherein said flexible bag is formed of a flexible material having a porosity for resisting passage of said sorbent material.

10. The method of claim 1, wherein said flexible bag is made of an air permeable polyester fabric.

11. The method of claim 1, wherein said flexible bag is substantially rectangular.

12. The method of claim 1, wherein said lip is pliable for facilitating the step of forcing said lip into said receiving slot.

13. The method of claim 1, wherein said lip includes at least two lip sections and said frame forms at least two receiving slot sections, and further wherein assembling said new sorbent filter comprises:

forcing each of said lip sections into a respective one of said receiving slot sections.

14. The method of claim 13, wherein said receiving slot sections are spaced from one another.

15. The method of claim 13, wherein said lip sections art non-contiguous.

16. The method of claim 13, wherein said lip sections include a first lip section, a second lip section perpendicular to said first lip section, a third lip section opposite said first lip section, and a fourth lip section opposite said second lip section, and further wherein said frame forms four receiving slot sections, and further wherein assembling said new sorbent filter further comprises:

forcing said first lip section into said first receiving slot section;

forcing said second lip section into said second receiving slot section;

forcing said third lip section into said third receiving slot section; and forcing said fourth lip section into said fourth receiving slot section.

17. The method of claim 16, wherein said flexible bag is substantially rectangular and said frame is substantially rectangular.

* * * * *